US011543996B2

(12) United States Patent
Heller et al.

(10) Patent No.: US 11,543,996 B2
(45) Date of Patent: *Jan. 3, 2023

(54) SYSTEMS AND METHODS FOR POWER MANAGEMENT IN A DATA STORAGE DEVICE

(71) Applicant: Western Digital Technologies, Inc., San Jose, CA (US)

(72) Inventors: Asaf Heller, Herzelia (IL); Nissim Elmaleh, Meitar (IL); Ishai Asa, Givataim (IL)

(73) Assignee: Western Digital Technologies, Inc., San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/354,005

(22) Filed: Jun. 22, 2021

(65) Prior Publication Data
US 2022/0011965 A1    Jan. 13, 2022

Related U.S. Application Data

(63) Continuation-in-part of application No. 16/879,595, filed on May 20, 2020, now Pat. No. 11,137,823.

(51) Int. Cl.
G06F 3/06 (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679

USPC ......................................................... 713/300
See application file for complete search history.

(56) References Cited

U.S. PATENT DOCUMENTS

| 5,440,690 | A | * | 8/1995 | Rege | G06F 13/24 713/323 |
| 5,754,557 | A | | 5/1998 | Andrewartha | |
| 6,044,004 | A | * | 3/2000 | Kramer | G11C 16/3431 365/45 |
| 10,185,385 | B2 | | 1/2019 | Diefenbaugh et al. | |
| 10,209,911 | B2 | | 2/2019 | Chin et al. | |
| 11,137,823 | B1 | * | 10/2021 | Richter | G06F 1/3253 |
| 2008/0288798 | A1 | * | 11/2008 | Cooper | G06F 1/3228 713/320 |
| 2013/0007483 | A1 | * | 1/2013 | Diefenbaugh | G06F 1/3278 713/320 |
| 2014/0195830 | A1 | * | 7/2014 | Chin | G06F 1/3243 713/320 |
| 2014/0195835 | A1 | * | 7/2014 | E | G06F 1/3253 713/323 |

(Continued)

*Primary Examiner* — Paul R. Myers
(74) *Attorney, Agent, or Firm* — Patterson & Sheridan, LLP; Steven H. VerSteeg

(57) ABSTRACT

A method and apparatus for data storage devices, or other devices that are L1 sub-state capable, to enter these sub-states while on the same network or bus as a device not enabled for transition to an L1 power sub-state. According to certain embodiments, a PCI FW register is configured to place a CLKREQ de-assert signal to a MAC of the data storage device, independent of the power state of the host. The CLKREQ de-assert signal causes the MAC to place the data storage device in an L1 power substate such as L1.2. A sensor of the controller remains active to detect a wakeup signal from the host that causes the data storage device to transition to a higher power state.

20 Claims, 11 Drawing Sheets

(56) References Cited

U.S. PATENT DOCUMENTS

| | | | |
|---|---|---|---|
| 2016/0231958 A1* | 8/2016 | Chin | G06F 1/3237 |
| 2017/0371574 A1* | 12/2017 | Springberg | G06F 13/4068 |
| 2018/0129270 A1* | 5/2018 | Garg | G06F 9/4411 |
| 2018/0150125 A1 | 5/2018 | HomChaudhuri et al. | |
| 2019/0041936 A1* | 2/2019 | Teoh | G06F 1/266 |
| 2020/0278733 A1 | 9/2020 | Li et al. | |
| 2020/0371578 A1 | 11/2020 | Murali et al. | |
| 2021/0104283 A1* | 4/2021 | Chyan | G06F 1/26 |

* cited by examiner

SYSTEMS AND METHODS FOR POWER MANAGEMENT IN A DATA STORAGE DEVICE

CROSS-REFERENCE TO RELATED APPLICATIONS

This application is a continuation-in-part of co-pending U.S. patent application Ser. No. 16/879,595, filed May 20, 2020. The related patent application is herein incorporated by reference.

BACKGROUND OF THE DISCLOSURE

Field of the Disclosure

Embodiments of the present disclosure generally relate to power management in a data storage device, and more particularly to data storage device power management independent of a host device.

Description of the Related Art

Although smaller CMOS geometries enable designers to reduce active power of devices, these same geometries have increased leakage current that impact a device's idle power consumption, especially in mobile devices. To address such issues, hardware standards have been improved, in standards such as PCIe, to include low power states. L0 is the representation of the power state of an active device or component, with L1, L2, and L3 representing lower power states for devices in idle states.

Of these low power states, L1 has the fastest recovery time to transition a device to the L0, or active state. L2 and L3 require substantially longer to transition to L0, sometimes measured in milliseconds, considered to be too long for mobile devices and high performance computing. As a result, the PCIe standard has been changed to include additional L1 power states—L1.1 and L1.2 sub-states. These sub-states consume far less power than the L1 state, and can be brought back to the L0 state much faster than the L2 and L3 states.

However, adoption of the L1 power sub-states is not common to all devices. If all endpoint devices on a common PCIe network do not have the L1 power sub-states enabled, under current approaches, no device on that network can transition to an L1.1 or L1.2 power sub-state. As a result, all devices on such a network continue to consume relatively large amounts of power in the L1 power state, and are unable to take advantage of the far lower power requirements capable at the L1 power sub-states.

Thus, there is a need in the art for an improved L1 power sub-state support in a data storage device.

SUMMARY OF THE DISCLOSURE

The present disclosure generally relates to methods and systems for data storage devices, or other devices that are L1 sub-state capable, to enter these sub-states while on the same network or bus as a device not enabled for transition to an L1 power sub-state. According to certain embodiments, a PCI FW register is configured to place a CLKREQ de-assert signal to a MAC of the data storage device, independent of the power state of the host. The CLKREQ de-assert signal causes the MAC to place the data storage device in an L1 power sub-state such as L1.2. A sensor of the controller remains active to detect a wakeup signal from the host that causes the data storage device to transition to a higher power state.

In one embodiment, a data storage device is disclosed that includes a MAC comprising a CLKREQ, a PHY comprising a sensor; and a controller. The controller is configured to detect that a host device has entered an L1 power state, emulate a CLKREQ de-assert, and provide the CLKREQ de-assert to the MAC.

In another embodiment, a controller for a data storage device that includes a memory device comprising computer-readable instructions, and a processor coupled to the memory device and configured to read the computer-readable instructions. The computer-readable instructions cause the processor to detect a host device in an L1 power state, detect a CLKREQ signal asserted on a MAC of the controller, and emulate the CLKREQ signal as de-asserted.

In another embodiment, a data storage device that includes a memory means, and a controller means coupled to the memory means configured to execute a method for power management. The method includes emulating with a CLKREQ de-assert signal to a MAC of the controller means, and placing the data storage device in a sub-L1 power state, responsive to means for emulating the CLKREQ de-assert signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure describes methods and systems for data storage devices, or other devices that are L1 sub-state capable, to enter these sub-states while on the same network or bus as a device not enabled for transition to an L1 power sub-state. According to certain embodiments, a PCI FW register is configured to place a CLKREQ de-assert signal to a MAC of the data storage device, independent of the power state of the host. The CLKREQ de-assert signal causes the MAC to place the data storage device in an L1 power substate such as L1.2. A sensor of the controller remains active to detect a wakeup signal from the host that causes the data storage device to transition to a higher power state.

Figure 1:
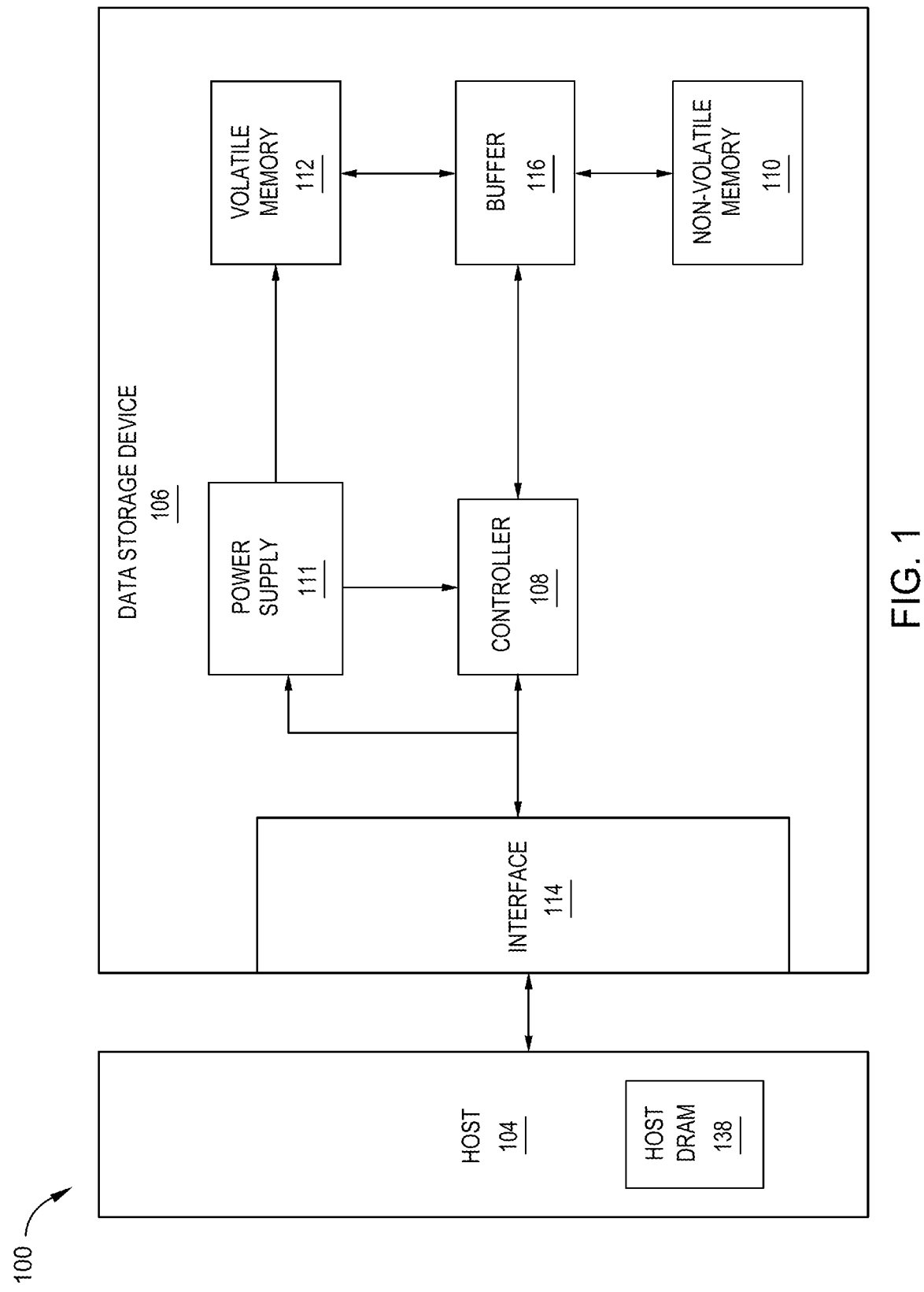
FIG. 1 is a schematic illustration of a computing system including a host device and a storage device, according to disclosed embodiments.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory devices (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, NVM 110, a power supply 111, volatile memory 112, an interface 114, and a buffer 116. The controller 108 comprises an internal memory or buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
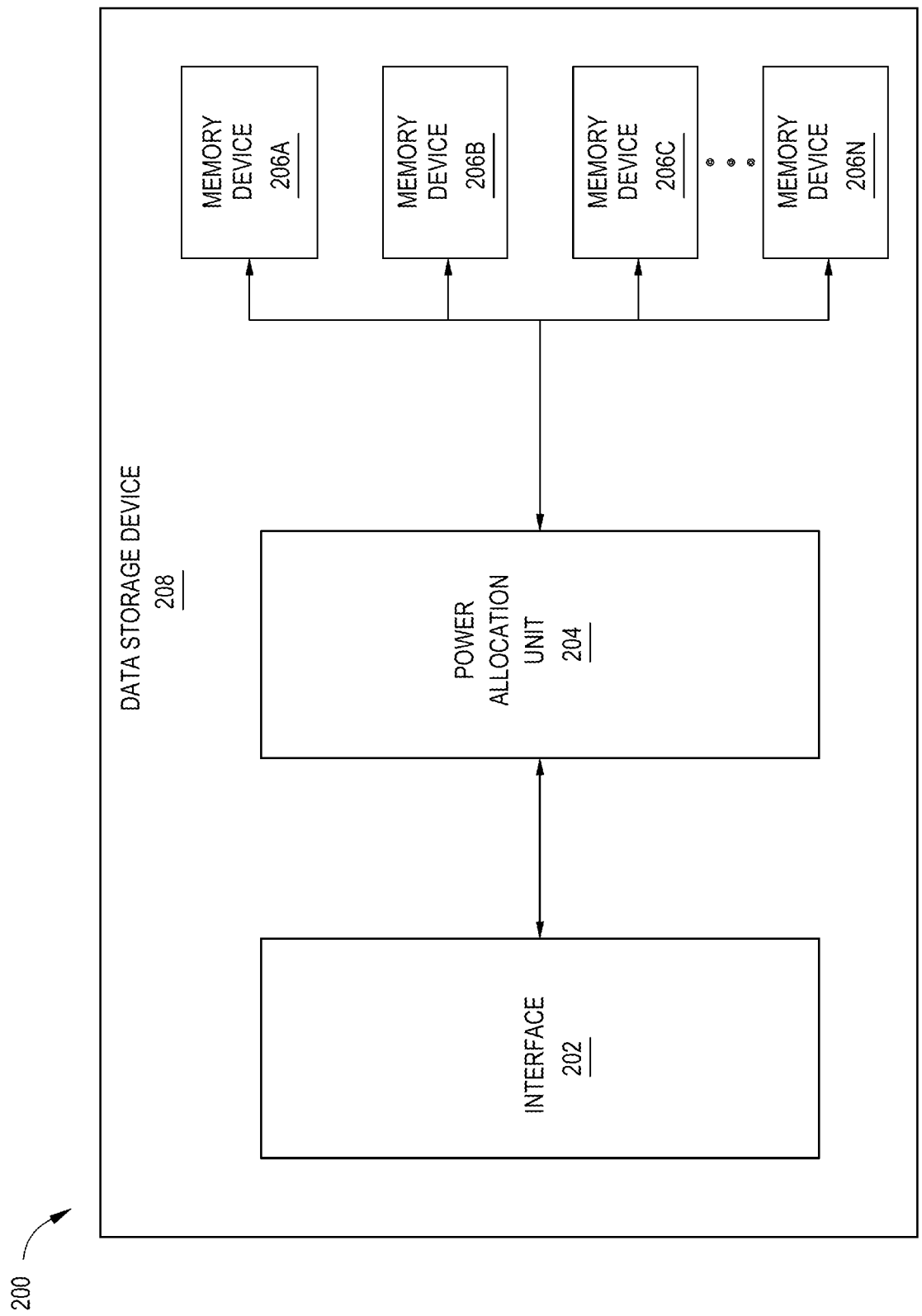
FIG. 2 is a schematic illustration of a data storage device, according to disclosed embodiments.

FIG. 2 is a schematic illustration 200 of a data storage device 208, according to one embodiment. Data storage device 208 comprises an interface 202 and a power allocation unit (PAU) 204. The interface 202 may be the interface 114 of FIG. 1. The data storage device 208 further comprises an array of memory devices 206A-206N (collectively referred to as memory devices 206). The notation "N" refers to the last memory device of a plurality of memory devices. Furthermore, the memory devices 206 may be the non-volatile memory 110 of FIG. 1 or an NVMe storage device. Each of the memory devices 206A-206N may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). However, the listed data storage size of the memory devices is not intended to be limiting nor restricting. Furthermore, in one embodiment, memory devices 206A-206N are the same type and have the same data storage sizes. In another embodiment, memory devices 206A-206N are different types but have the same data storage sizes. In yet another embodiment, memory devices 206A-206N are different types and have different data storage sizes.

The PAU 204 may be coupled with a controller (not shown), such as the controller 108 of FIG. 1. The PAU 204 appropriates power received from the host device, such as the host device 104 of FIG. 1, to each of the memory devices 206. The controller 108 may determine the appropriate power state of each memory device 206A-206N, and the PAU 204 provides the corresponding power to each memory device 206A-206N.

The host device 104 may provide a suitable amount of power to the data storage device 208 through one or more pins on the interface 202. The suitable amount of power may be more than or equal to the amount of power the data storage device 208 requires to operate. For example, the power a data storage device 208 may receive from the host device 104 may be about 5 W. Furthermore, a data storage device 208 may draw out about 500 mW to about 15 W of power from the host device 104. The previously mentioned values for power are not intended to be limiting, but to provide a reference.

Figure 3:
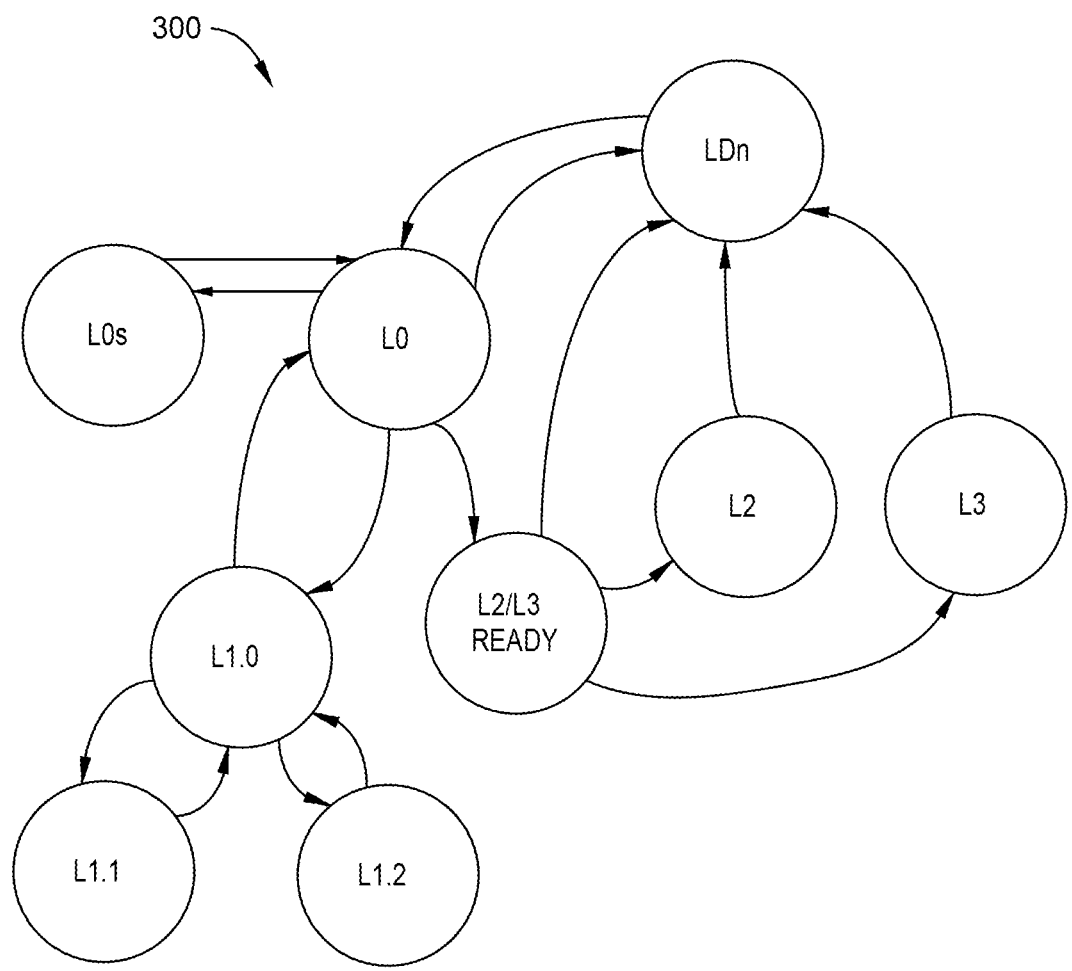
FIG. 3 depicts a link power management flow diagram, according to disclosed embodiments.

FIG. 3 depicts a link power management flow diagram 300, according to disclosed embodiments. A link training and status state machine (LTSSM) transitions the device, such as the data storage device 208 of FIG. 2, to a different power state by utilizing a PAU, such as the PAU 204 of FIG. 2. A memory device 206A-206N may have several low power mode power states. For exemplary purposes, the low power mode power states are referred to as power states. For example, a memory device 206A-206N may have the following 5 power states: L0, L0s L1, L2, and L3. Each of the power states are associated with a distinct data storage device 208 operation. Power states L0, L0s, and L1 are considered operational power states, utilizing about 1 W to about 8 W of power, whereas Power states L2 and L3 are considered non-operational power states, utilizing about 2 mW to about 50 mW of power. An operational power state refers to the ability of a host device, such as the host device 104 of FIG. 1, to communicate with a memory device 206A-206N of a data storage device 208.

Power states are numbered sequentially, where higher numbers represent lower power requirements, due to a greater number of offline circuits, and corresponding higher exit latencies. Furthermore, each power state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the power states and exit latencies are not intended to be limiting, but to provide an example of possible embodiments.

L0 is referred to as a fully operational state, where I/O commands are enabled, and the device may generate interrupts. Interrupts are an automatic transfer of firmware execution due to a system timer or a user command. Power states L0s and L1 are also operational states; however, L0s and L1 may have a lower functionality than that of L0. For example, L0s has a similar power requirement as that of the L0, but only allows for a serial link in one direction. However, L1 allows for a bidirectional serial link and allows for a greater reduction in the power requirement, but has a higher exit latency than that of L0 and L0s. Power states L2 and L3 are non-operational power states have a power requirement less than that of the operational power states. Furthermore, memory devices 206 not used are placed in a non-operational power state, L2 and L3, to limit the idle power consumption to a minimal value.

In order for I/O commands to occur, the memory device 206A-206N is woken up and placed into either L0, L0s, or L1. The controller, such as the controller 108 of FIG. 1, utilizes the PAU 204 to change the power state of a memory device 206A-206N from the operational power states, such as L0, L0s, or L1, to a different operational power state, such as L0, L0s, or L1, or to a non-operational power state, such as L2 or L3, depending on the situation. However, in order for a memory device 206A-206N to be placed into L2 or L3, the memory device 206A-206N will need to be in power state L2/L3 ready, which is a pseudo-state to prepare the component for a loss in power and reference clock(s). However, the controller 108 utilizes the LTSSM and the PAU 204 to allocate the appropriate amount of power to return all power states L0s, L1, L2, L3 into power state L0 when a full operational state is required. For example, to return to L0 from L2 or L3, the memory device 206A-206N transitions to a transient pseudo-state, LDn, before transitioning to L0. The LDn state may be a fundamental reset state, a hot reset state, or a link disable transmission state by the upstream component (e.g., the host).

As shown in FIG. 3, the power state L1 in some embodiments includes additional sub-states, L1.1 and L1.2, where the power state L1 is referred to as L1.0. The L1 sub-states (L1SS), L1.1 and L1.2, may require more power for operation than L2 and L3; however, the L1SS utilizes less power than the L1.0 state. At an L1SS, the memory device 206A-206N remains operational and requires less power to return to a more operational state, such as L1.0 or L0, by using the LTSSM. Furthermore, the L1SS requires less time than the L2 and/or the L3 states to return to a full active power state L0.

Figure 4:
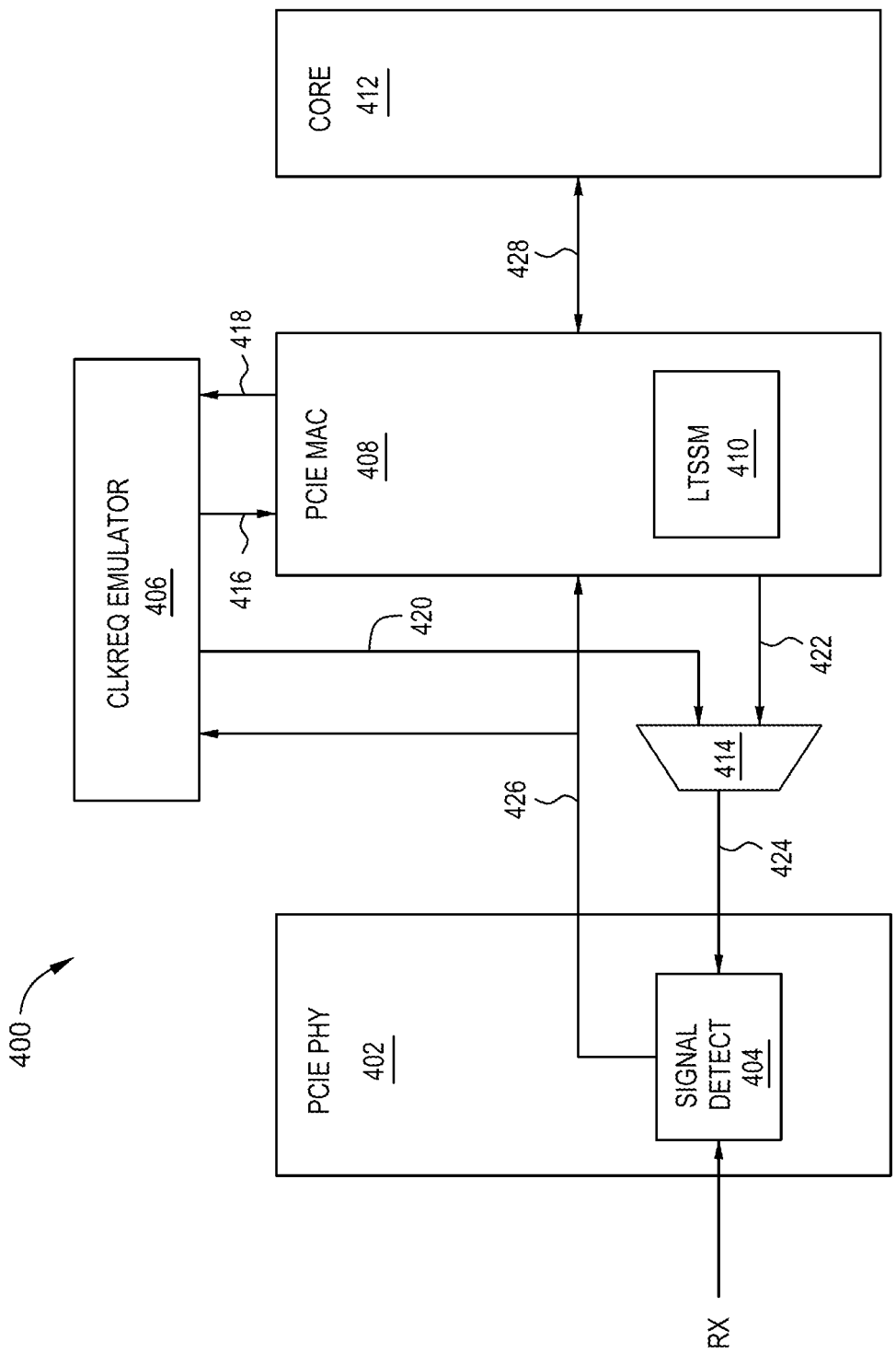
FIG. 4 depicts a schematic representation of a device capable of L1 sub-state support, according to disclosed embodiments.

FIG. 4 depicts a schematic representation of a device 400 capable of L1 sub-state support, according to disclosed embodiments. In some embodiments, one or more devices coupled to a PCIe bus that is coupled to device 400 do not support L1SS, and in further embodiments, a host composed of device 400 does not support L1SS. The device 400 includes a PCIe PHY 402, including a signal detect module 404, a CLKREQ emulator 406 (in some embodiments a CLKREQ), a PCIe MAC 408, including an LTSSM 410, a core 412, and a multiplexer 414. Communication between the multiplexer 414 and the signal detect module 404 occurs along a first circuitry 424. The signal detect module 404 transmits a signal along a second circuitry 426 to both the CLKREQ emulator 406 and the PCIe MAC 408. The signal transmitted by the signal detect module 404 may request the current link state of the CLKREQ emulator 406 and the PCIe MAC 408. The core 412 and the PCIe MAC 408 may communicate or exchange data via a toggle mode bus 428.

In order to create an environment where the link remains in an L1 state and the device 400 transitions to an L1SS, the CLKREQ emulator 406 sends a sideband signal request to the signal detect module 404. For example when the PCIe MAC 408 requests to transition to an L1SS, the CLKREQ emulator 406 receives a CLKREQ#_out signal 418 from the PCIe MAC 408. The CLKREQ emulator 406 then sends a CLKREQ#_in signal 416 to indicate to the PCIe MAC 408 to initiate the power mode transition (e.g., from L1.0 to L1.1 or L1.2).

The CLKREQ emulator 406 and the PCIe MAC 408 both sends a signal to the signal detect module 404. The PCIe MAC signal 422 indicates that the device 400 is transitioning to an L1SS and attempts to turn off the signal detect module 404. However, the CLKREQ emulator signal 420 sends a signal to the signal detect module 404 to request the signal detect module 404 to remain active. The PCIe MAC signal 422 and the CLKREQ emulator signal 420 enter a multiplexer 414, where the multiplexer 414 determines which signal to send to the signal detect module 404. In some embodiments, multiplexer 414 could be a logic gate (AND, NAND, OR, NOR, XOR, etc.) or combination of logic gates. The multiplexer 414, generally, determines that the CLKREQ emulator signal 420 takes priority and passes the CLKREQ emulator signal 420 to the signal detect module 404, while the PCIe MAC signal 422 is ignored. Since the CLKREQ emulator signal 420 is received by the signal detect module 404, the signal detect module 404 remains on.

When exiting an L1SS, the link partner requests to exit the L1 (L1.0) state to the L0 state. The CLKREQ emulator 406 sends a CLQREQ#_in signal 416 to the PCIe MAC 408 to exit the L1SS to the L1.0 state. At the L1.0 state, the PCIe MAC 408 sends a PCIe MAC signal 422 to the signal detect module 404 to transition the power state to L0.

Figure 5:
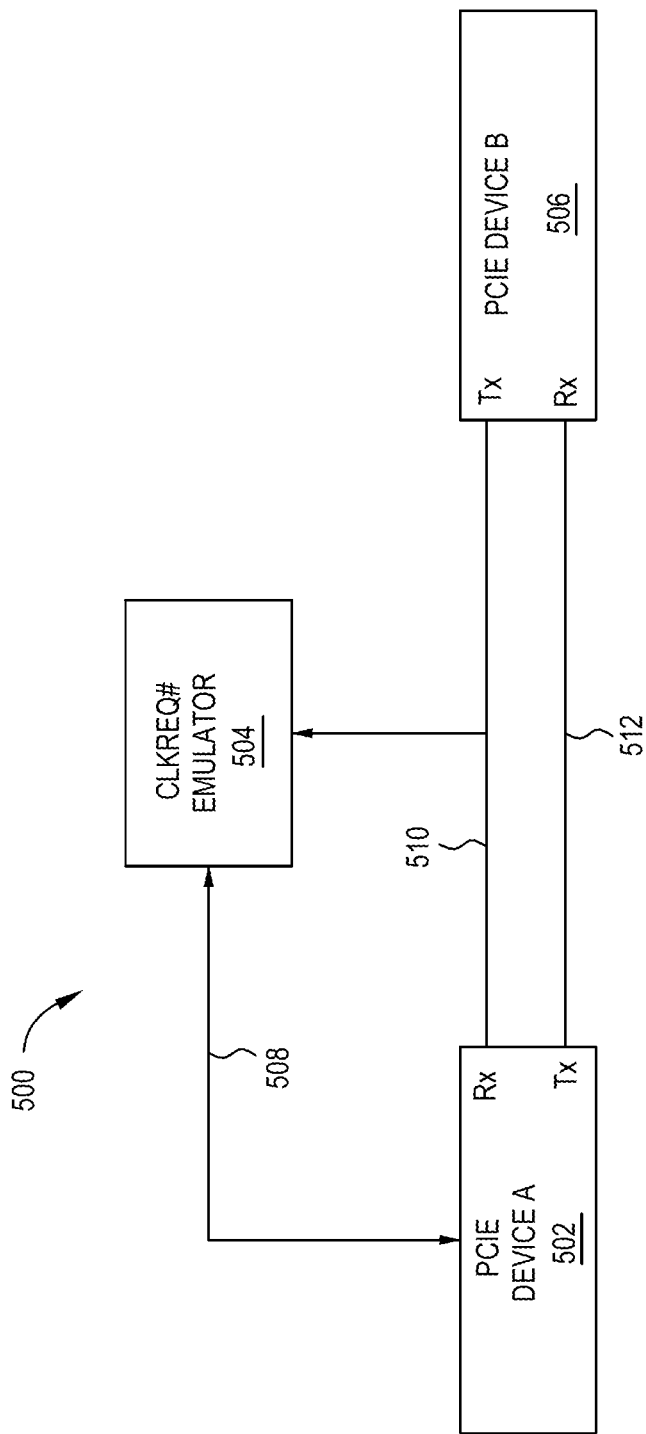
FIG. 5 depicts a system capable of L1 sub-state support, according to disclosed embodiments.

FIG. 5 depicts a system 500 capable of L1 sub-state support, according to disclosed embodiments. The system 500 includes a PCIe device A 502, a PCIe device B 506, and a CLKREQ# emulator 504. The CLKREQ# emulator 504 may the CLKREQ emulator 406 of FIG. 4. In one embodiment, the PCIe device A 502 supports L1SS, and the PCIe device B 506 does not support L1SS. The low power link is halted at the L1.0 state since one or more devices, such as the PCIe device B 506, does not support L1SS.

However, the CLKREQ# emulator 504 includes a first circuit 508 and a second circuit 510. The first circuit 508 controls the signaling of the CLKREQ# of the PCIe device A 502. The second circuit 510 detects the transmission along the Rx/Tx line, where the Rx corresponds to the PCIe device A 502 and the Tx corresponds to the PCIe device B 506. The PCIe device A 502 is the receiver and the PCIe device B 506 is the transmitter on the second circuit 510. The PCIe device A is the transmitter along the third circuit 512 to the PCIe device B 506. The detection of the transmission along the second circuit 510 from the PCIe device B 506 to the CLKREQ# emulator 504 signals the PCIe device A 502 via the first circuit 508 to exit to a low power state, such as L1.1 or L1.2.

Figure 6:
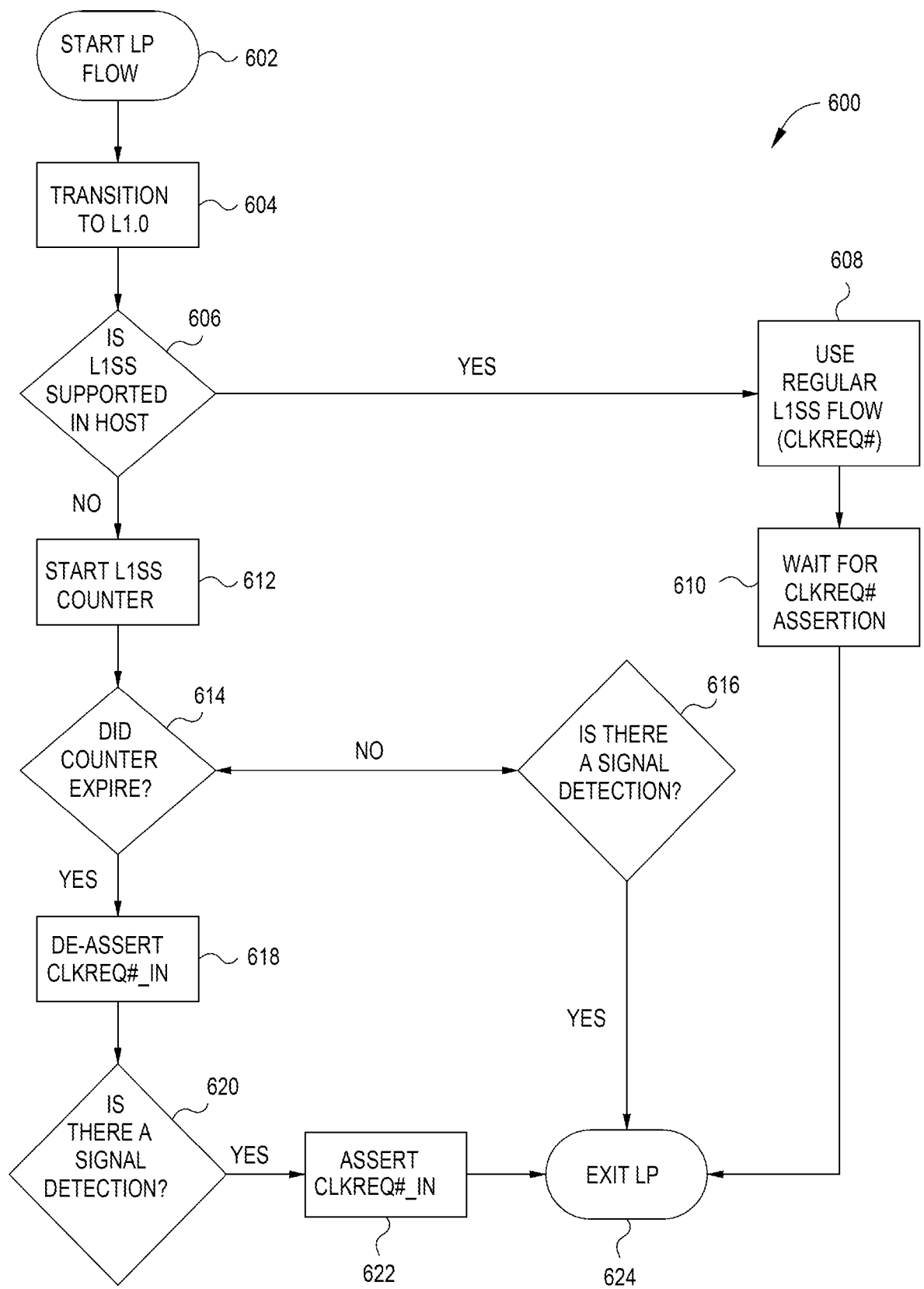
FIG. 6 depicts a flow diagram for L1 sub-state support, according to disclosed embodiments.

FIG. 6 depicts a flow diagram 600 for L1 sub-state support, according to disclosed embodiments. The L1SS includes the lower power sub-states L1.1 and L1.2, where the device, such as the PCIe device A 502 of FIG. 5, has L1SS capability. At block 602, the low power flow is started, where the device is in a L0 state. The device is transitioned form the L0 state to the L1.0 state at block 604. At block 606, if the L1SS is supported by the host, such as the host device 104 of FIG. 1, then the regular L1SS flow initiated utilizing the CLKREQ# emulator at block 608. At block 610, the PCIe MAC, such as the PCIe MAC 408, waits for the CLKREQ# assertion by the CLKREQ# emulator. The CLKREQ# assertion is a signal to exit the low power mode at block 624, such that the device exits the L1SS to the L1.0 state and returns to the L0 state.

However, if the L1SS is not supported by the host at block 606, then an L1SS counter starts at block 612. The L1SS counter counts to a predetermined amount of time (e.g., predetermined value) to allow for a low power transition request to be sent by the host. If the counter expires at block 614 and no signal detection was detected, then the CLKREQ#_in signal is de-asserted at block 618. By de-asserting the CLKREQ#_in signal at block 618, the device is transitioned to an L1SS. When a signal from the host is detected at block 620, the device asserts a CLKREQ#_in signal at block 622 to exit the L1SS and transition to the L0 state at block 624. Furthermore, if the counter expires at block 614 and a signal has been detected at block 616, then the PCIe MAC transitions the device out of the L1SS to the L0 state.

Figure 7:
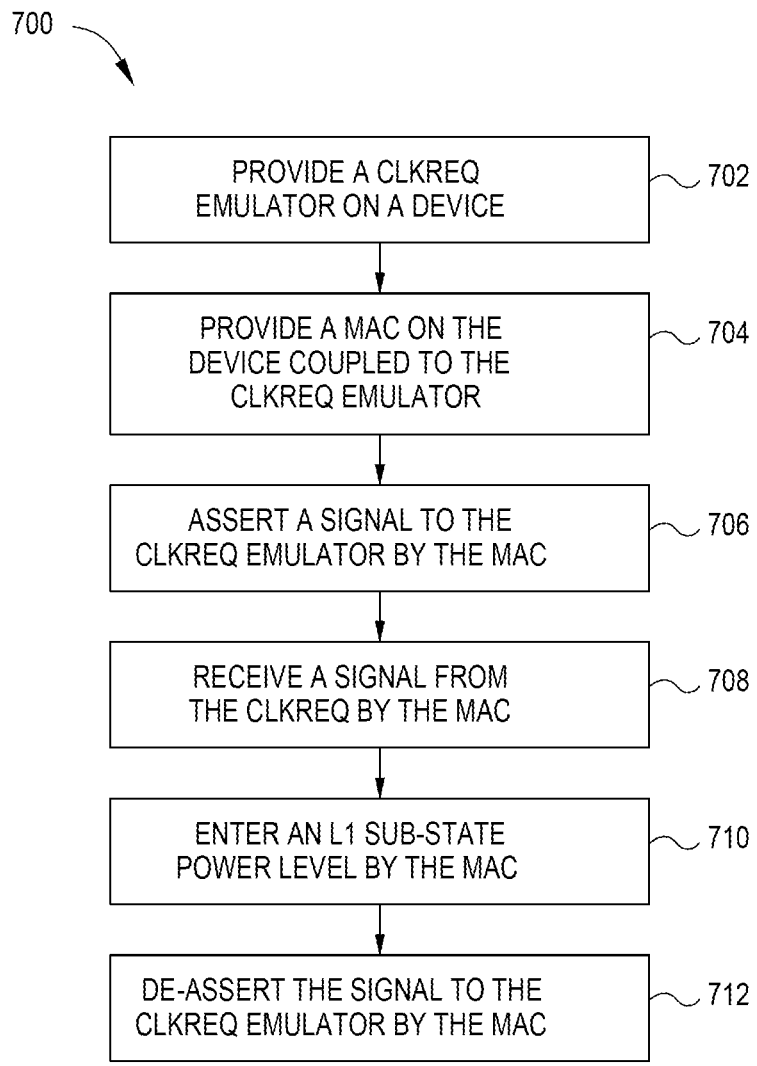
FIG. 7 depicts a method for entering an L1 sub-state in the presence of an L1 device, according to disclosed embodiments.

FIG. 7 depicts a method 700 for entering an L1 sub-state in the presence of an L1 device, according to disclosed embodiments. At block 702, a CLKREQ emulator is included in the device. At block 704, a MAC, such as the PCIe MAC 408 of FIG. 4, coupled to the CLKREQ emulator is provided to the device. At block 706, a signal, such as the CLKREQ#_out signal 418, is asserted to the CLKREQ emulator by the MAC to indicate a transition to an L1SS. At block 708, a signal, such as the CLKREQ#_in signal 416, is received by the MAC from the CLKREQ emulator. At block 710, the MAC transitions the device to an L1SS. The CLKREQ emulator and the MAC both send a signal to the signal detect module of the PHY device. However, the CLKREQ emulator signal takes priority and keeps the signal detection module active for a request from the host to exit the L1SS. The CLKREQ#_out signal to the CLKREQ emulator is de-asserted by the MAC at block 712 when the device transitions to the L1SS.

Figure 8:
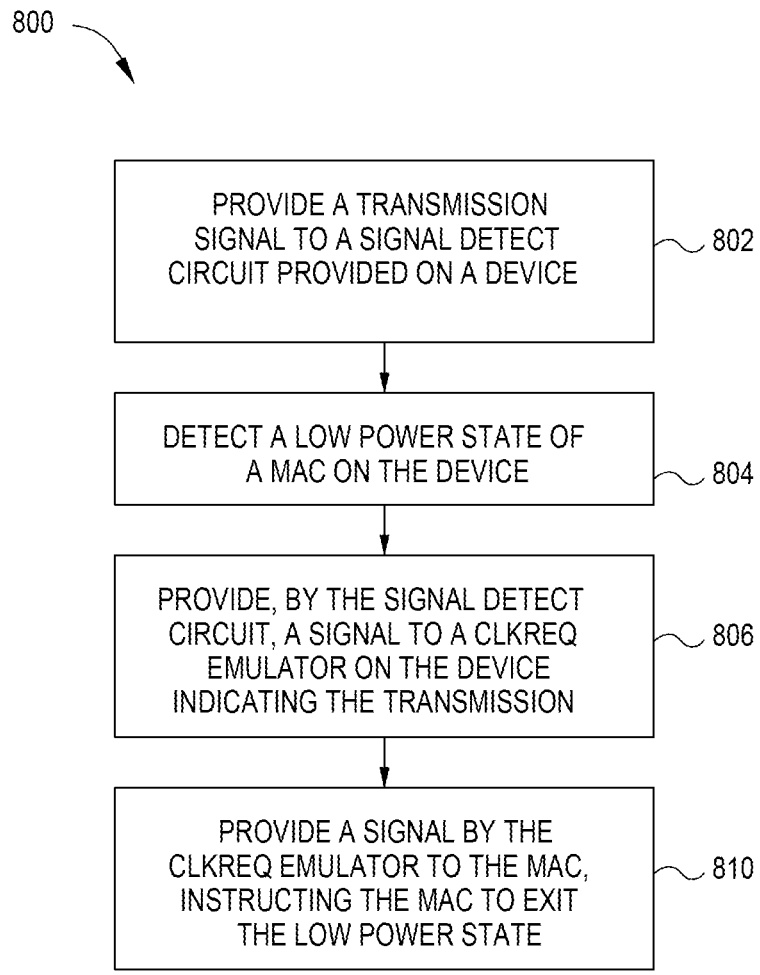
FIG. 8 depicts a method for exiting an L1 sub-state in the presence of L1 or device, according to disclosed embodiments.

FIG. 8 depicts a method 800 for exiting an L1 sub-state in the presence of L1 or device, according to disclosed embodiments. At block 802, the host provides a transmission signal to the signal detect circuit included on the device. The signal detect identifies that the MAC is in an L1SS at block 804. The CLKREQ#_in signal is de-asserted by the CLKREQ emulator at block 806 due to the transmission of a request to exit the L1SS along the signal detect circuit. At block 810, the CLKREQ emulator sends a CLKREQ#_in signal to the MAC to transition the device out of an L1SS to the L0 state.

Figure 9:
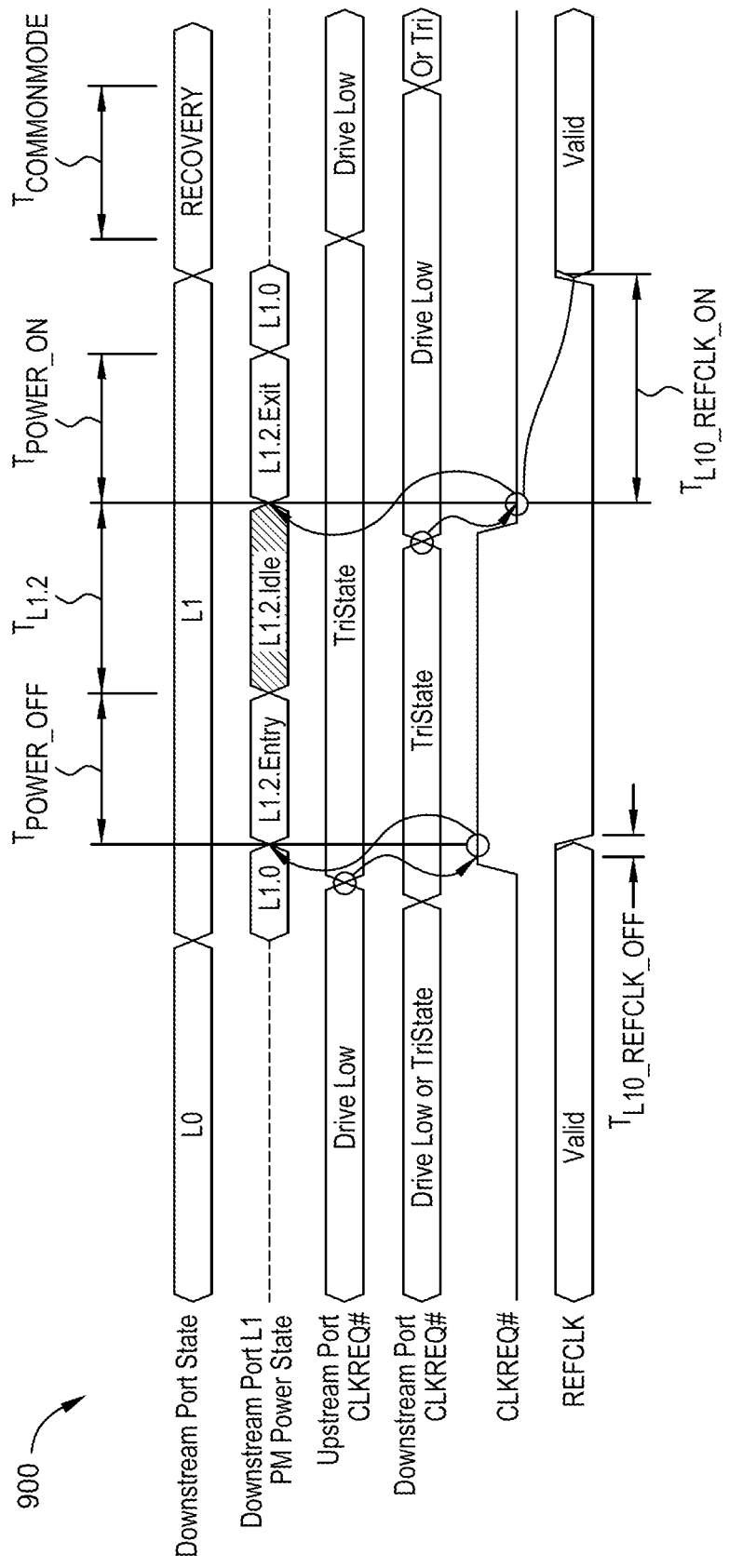
FIG. 9 is a timing diagram corresponding to entering and exiting an L1 sub-state, according to certain embodiments.

FIG. 9 is a timing diagram 900 corresponding to entering and exiting an L1 sub-state, according to certain embodiments. The timing diagram 900 includes a downstream port state, a downstream port L1 PM power state, an upstream port CLKREQ#, a downstream port CLKREQ#, a CLKREQ# signal, and a REFCLK signal. The downstream port state may refer to the power state of the link. For example, in the timing diagram 900, the downstream port state goes from L0 to L1 to a recovery state, where the recovery state refers to waking up from the L1 state.

However, the downstream port L1 PM power state may enter an L1 sub-state when the downstream port state enters the L1 state. When the downstream port state is in the L1 power state, the downstream L1 power manager (PM) power state may either be in an L1.0 state, an L1.2.Entry state, an L1.2.Idle state (i.e., L1.2 power state), or an L1.2.Exit state. The L1.2.Entry state and the L1.2.Exit state may be transitional power states. The L1 sub-states are lower power states that have a lower power consumption or requirement than the L1 (or L1.0) power state. Thus, additional power may be saved by transitioning to the L1 sub-states. It is to be understood that the L1 sub-state may additionally include entering an L1.1 power state.

The upstream port CLKREQ# may refer to the clock request signal at the upstream port and the downstream port CLKREQ# may refer to the clock request signal at the downstream port. The upstream port CLKREQ# may either be in a drive low level or a tristate level. Likewise, the downstream port CLKREQ# may either be in a drive low level or a tristate level. The CLKREQ# signal may drive the power state switch into the L1 sub-states. The REFCLK may refer to the clock signal used to synchronize and schedule operations.

While the downstream port state is in the L0 state, the upstream port CLKREQ# is in a drive low level and the downstream port CLKREQ# may either be in a drive low level or a tristate level. The CLKREQ# is asserted or has a low signal value. The REFCLK is valid during the L0 state timeframe. When the downstream port state goes from L0 to L1, such that a request to enter a low power state is received from a host device, such as the host device 104 of FIG. 1, the upstream port CLKREQ# changes to the tristate level. Likewise, the downstream port CLKREQ# is in the tristate level.

When the CLKREQ# is de-asserted or switches from low to high, the downstream port L1 PM power state enters the L1.2.Entry state. The L1.2.Entry state may correspond to a transitional state between the L1.0 power state and the L1.2 state. In the timing diagram 900, the transition of the upstream port CLKREQ# from a drive low level to a tristate level and the assertion of the CLKREQ# signal transitions the downstream port L1 PM power state to the L1.2.Entry state.

When the downstream port L1 PM power state is in the L1.2.Idle state and both the downstream port CLKREQ# switches from the tristate level to the drive low level and then CLKREQ# signal is asserted, the downstream port L1 PM power state enters the L1.2.Exit state. The CLKREQ# signal may be asserted upon receiving a wake up signal from the host device 104. When the REFCLK signal is valid after entering the L1.0 state from the L1.2.Exit state, the downstream port state enters the recovery state.

The time to transition from the L1.0 state to the L1.2.Entry state after the CLKREQ# signal is asserted is illustrated as $T_{L10\_REFCLK\_OFF}$. The time to transition between the L1.2.Entry state and the L1.2.Idle state is denoted by $T_{POWER\_OFF}$, the time that the link state is in the L1.2.Idle state is denoted by $T_{L1.2}$, and the time to transition from the L1.2.Idle state to the L1.0 state is denoted by $T_{POWER\_ON}$.

Figure 10:
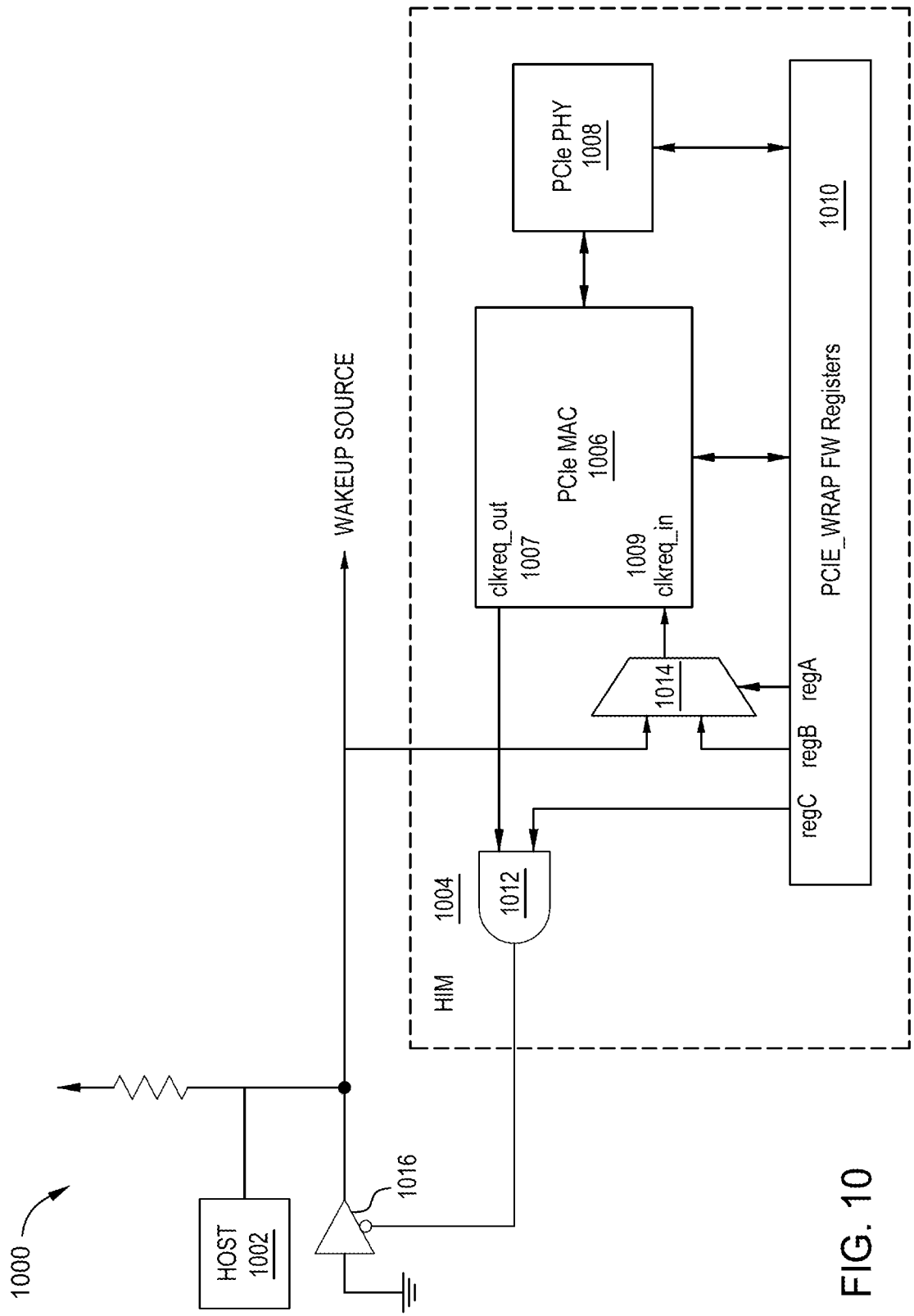
FIG. 10 is a schematic block diagram illustrating signaling of a host interface module (HIM) to enter and exit an L1 sub-state, according to certain embodiments.

FIG. 10 is a schematic block diagram 1000 illustrating signaling of a host interface module (HIM) 1004 to enter and exit an L1 sub-state, according to certain embodiments. The signaling may resemble the timing diagram 900 of FIG. 9. Furthermore, the L1 sub-state may either be the L1.2 power state or the L1.1 power state. The HIM 1004 may be a component of the controller 108 of FIG. 1. A host device 1002 is electrically coupled to the HIM 1004, such that signals may be sent to and from the host device 1002 and the HIM 1004. The signals may include a signal from the host device 1002 instructing the HIM 1004 to enter a low power state, as an L1 state, or a signal to wake up the HIM 1004 from the low power state.

The HIM 1004 includes a PCIe multi-accumulate (MAC) unit 1006, a PCIe physical layer (PHY) 1008, and PCIe_Wrap FW registers 1010. It is to be understood that the term PCIe is used for exemplary purposes and other protocols are contemplated. The PCIe MAC unit 1006 includes a clkreq_out 1007 and a clkreq_in 1009. The PCIe MAC unit 1006 is coupled to both the PCIe PHY 1008 and the PCIe_Wrap FW registers 1010, where the PCIe PHY 1008 is also coupled to the PCIe_Wrap FW registers 1010.

When the host device 1002 instructs the HIM 1004 to enter the L1 power state, such as by a host generated command, the signal is sent to a multiplexer (mux) 1014. The mux 1014 includes inputs from the host device 1002 and the PCIe_Wrap FW registers 1010 and includes an output to the clkreq_in 1009 of the PCIe MAC unit 1006. The L1 power state command is received at the PCIe MAC unit 1006, where the PCIe MAC unit 1006 may instruct cause the PCIe PHY 1008 to enter the L1 power state. When the PCIe PHY 1008 enters the L1 power state, the controller 108 may be in the same state. The PCIe PHY 1008 and the PCIe MAC unit 1006 sends a signal associated to the L1 power state to the PCIe_Wrap FW registers 1010.

The PCIe_Wrap FW registers 1010 includes registers: regA, regB, and regC. It is to be understood that the PCIe_wrap FW registers 1010 may include additional registers not shown. RegA and regB are coupled to the mux 1014 and regC is coupled to an AND gate 1012. When the PCIe PHY 1008 enters the L1 power state, the PCIe_Wrap FW registers 1010 may generate or emulate a CLKREQ de-assert signal, where the de-assert signal is sent to the mux 1014 via regB. The emulation of the CLKREQ de-assert signal may be hidden from the host device 1002, such that the L1 sub-states may be entered without host device 1002 instruction. Furthermore, the emulation may be based on an updating of regB to indicate that the L1 sub-state should be entered. When the de-assert signal is sent to the mux 1014 via regB, the regA selects the de-assert signal to send to the PCIe MAC unit 1006 at clkreq_in 1009. The de-assert signal may cause the PCIe PHY 1008 to enter an L1 sub-state, such as the L1.2 power state. The clkreq_out 1007 sends a signal responsive to the state of the PCIe MAC unit 1006 to the AND gate 1012, where a signal output by the AND gate 1012 is sent to an amplifier 1016.

When the host device 1002 or another wake up source sends a signal to a sensor of the PCIe PHY 1008 to wake up from the L1 power state, the sensor sends a signal or indicates to the PCIe MAC unit 1006 to assert the CLKREQ signal via regB of the PCIe_Wrap FW registers 1010. The sensor remains active when the PCIe PHY 1008 transitions to the L1 power state or the L1 sub-state. Thus, the PCIe_Wrap FW registers 1010 discontinues emulation of the CLKREQ de-assert and the PCIe PHY 1008 awakes from the L1 sub-state to the L1 power state and/or the L0 power state.

Figure 11:
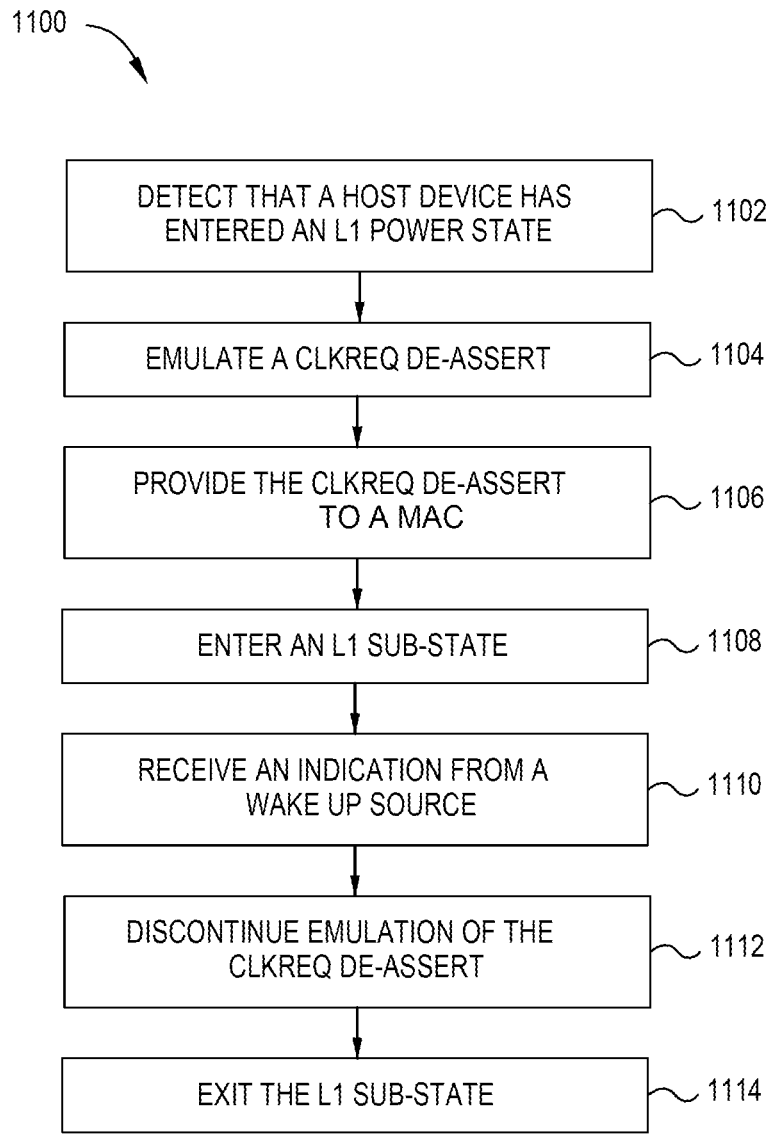
FIG. 11 is a flow diagram illustrating a method of entering and exiting an L1 sub-state, according to certain embodiments.

FIG. 11 is a flow diagram illustrating a method 1100 of entering and exiting an L1 sub-state, according to certain embodiments. Aspects of the schematic block diagram 1000 may be referenced for exemplary purposes. At block 1102, the controller, such as the controller 108, detects that a host device, such as the host device 104 of FIG. 1, has entered an L1 power state. The detection may be by the PCIe MAC 1006. In some embodiments, the controller 108 may receive a command for the data storage device to enter the L1 power state. At block 1104, the PCIe_Wrap FW registers 1010 emulates a CLKREQ de-assert signal. At block 1106, the CLKREQ de-assert signal is provided to the PCIe MAC 1006. When the PCIe MAC 1006 receives the CLKREQ de-assert signal at block 1106, the PCIe PHY 1008 enters an L1 sub-state at 1108, such as L1.2. While the PCIe PHY 1008 is in the L1 sub-state, a sensor coupled to a wake up source remains active. At block 1110, the sensor receives an indication from the wake up source, which may be the host device 104. At block 1112, the emulation of the CLKREQ de-assert is discontinued and the PCIe PHY 1008 exits the L1 sub-state at block 1114.

By emulating a CLKREQ de-assert signal, the data storage device may transition to an L1 sub-state with or without host device instruction, which may result in greater power savings while the data storage device is in an idle power state mode.

In one embodiment, a data storage device is disclosed that includes a MAC comprising a CLKREQ, a PHY comprising a sensor; and a controller. The controller is configured to detect that a host device has entered an L1 power state, emulate a CLKREQ de-assert, and provide the CLKREQ de-assert to the MAC.

The data storage device further includes a register coupled to the MAC to emulate the CLKREQ de-assert. The controller is further configured to place the data storage device in an L1 sub-state power level, responsive to the CLKREQ de-assert. The PHY is placed into the L1 sub-state power level, and responsive to the CLKREQ de-assert, the sensor of the PHY being in an active state. The sensor is coupled to a wake up source configured to be coupled to the host device. The controller being further configured to discontinue emulation of the CLKREQ de-assert. The controller is further configured to exit the L1 sub-state power level responsive to the sensor receiving a signal from the wake up source.

In another embodiment, a controller for a data storage device that includes a memory device comprising computer-readable instructions, and a processor coupled to the memory device and configured to read the computer-readable instructions. The computer-readable instructions cause the processor to detect a host device in an L1 power state, detect a CLKREQ signal asserted on a MAC of the controller, and emulate the CLKREQ signal as de-asserted.

The MAC, responsive to the CLKREQ signal causes the data storage device to transition to a sub-L1 power state. The controller further includes a register coupled to the MAC, configured to emulate the CLKREQ signal as de-asserted. The controller further includes a PHY coupled to the MAC, the PHY transitioning to the sub-L1 power state, the PHY comprising a sensor that remains active when the PHY transitions to the sub-L1 power state. The sensor is configured to be communicatively coupled to the host device, and configured to detect a transition of the host to a different power state. The PHY is configured to transition to one of an L1 power state and L0 power state, responsive to the sensor detecting a transition of the host to a different power state. The register discontinues emulating the CLKREQ signal as de-asserted, responsive to the PHY transitioning to one of an L1 power state and L0 power state. The data storage device transitions to a different power state, responsive to the register discontinuing emulation of the CLKREQ signal as de-asserted.

In another embodiment, a data storage device that includes a memory means, and a controller means coupled to the memory means configured to execute a method for power management. The method includes emulating with a CLKREQ de-assert signal to a MAC of the controller means, and placing the data storage device in a sub-L1 power state, responsive to means for emulating the CLKREQ de-assert signal.

The method further includes maintaining a sensor of the controller means in an active state. The method further includes detecting a signal from a host with the sensor, and transitioning the data storage device out of the sub-L1 power state, responsive to the detecting. The emulating the CLKREQ de-assert signal includes updating a register of the controller means based on a transition of a power state of the host. A PHY comprising the sensor is transitioned to the sub-L1 power state while the sensor remains active.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a MAC comprising a CLKREQ;
a PHY comprising a sensor;
a controller configured to:
   detect that a host device has entered an L1 power state;
   emulate a CLKREQ de-assert; and
   provide the CLKREQ de-assert to the MAC.

2. The data storage device of claim 1, further comprising a register coupled to the MAC to emulate the CLKREQ de-assert.

3. The data storage device of claim 2, wherein the controller is further configured to place the data storage device in an L1 sub-state power level, responsive to the CLKREQ de-assert.

4. The data storage device of claim 3, wherein the PHY is placed into the L1 sub-state power level, and responsive to the CLKREQ de-assert, the sensor of the PHY being in an active state.

5. The data storage device of claim 4, wherein the sensor is coupled to a wake up source configured to be coupled to the host device.

6. The data storage device of claim 5, the controller being further configured to discontinue emulation of the CLKREQ de-assert.

7. The data storage device of claim 5, wherein the controller is further configured to exit the L1 sub-state power level responsive to the sensor receiving a signal from the wake up source.

8. A controller for a data storage device, comprising:
a memory device comprising computer-readable instructions;
a processor coupled to the memory device and configured to read the computer-readable instructions, that cause the processor to:
   detect a host device in an L1 power state;
   detect a CLKREQ signal asserted on a MAC of the controller; and
   emulate the CLKREQ signal as de-asserted.

9. The controller of claim 8, wherein the MAC, responsive to the CLKREQ signal causes the data storage device to transition to a sub-L1 power state.

10. The controller of claim 9, further comprising a register coupled to the MAC, configured to emulate the CLKREQ signal as de-asserted.

11. The controller of claim 10, further comprising a PHY coupled to the MAC, the PHY transitioning to the sub-L1 power state, the PHY comprising a sensor that remains active when the PHY transitions to the sub-L1 power state.

12. The controller of claim 11, wherein the sensor is configured to be communicatively coupled to the host device, and configured to detect a transition of the host to a different power state.

13. The controller of claim 12, wherein the PHY is configured to transition to one of an L1 power state and L0 power state, responsive to the sensor detecting a transition of the host to a different power state.

14. The controller of claim 13, wherein the register discontinues emulating the CLKREQ signal as de-asserted, responsive to the PHY transitioning to one of an L1 power state and L0 power state.

15. The controller of claim 14, wherein the data storage device transitions to a different power state, responsive to the register discontinuing emulation of the CLKREQ signal as de-asserted.

16. A data storage device, comprising:
a memory means;
a controller means coupled to the memory means configured to execute a method for power management, the method comprising:
   emulating with a CLKREQ de-assert signal to a MAC of the controller means; and
   placing the data storage device in a sub-L1 power state, responsive to means for emulating the CLKREQ de-assert signal.

17. The data storage device of claim 16, the method further comprising maintaining a sensor of the controller means in an active state.

18. The data storage device of claim 17, the method further comprising detecting a signal from a host with the sensor, and transitioning the data storage device out of the sub-L1 power state, responsive to the detecting.

19. The data storage device of claim 18, wherein emulating the CLKREQ de-assert signal comprises updating a register of the controller means based on a transition of a power state of the host.

20. The data storage device of claim 19, wherein a PHY comprising the sensor is transitioned to the sub-L1 power state while the sensor remains active.

* * * * *